US011192502B2

(12) United States Patent
Van Stiphout et al.

(10) Patent No.: US 11,192,502 B2
(45) Date of Patent: Dec. 7, 2021

(54) FASTENING CONSTRUCTION FOR FASTENING AN ADJUSTMENT INSTRUMENT FOR AN EXTERIOR VISION ELEMENT, SUCH AS AN EXTERIOR MIRROR, CAMERA AND/OR DISPLAY, TO A CARRYING FRAME OF AN EXTERIOR VISION UNIT OF A MOTOR VEHICLE, AND EXTERIOR VISION UNIT

(71) Applicant: MCi (Mirror Controls International) NETHERLANDS B.V., Woerden (NL)

(72) Inventors: Paulus Gerardus Maria Van Stiphout, Woerden (NL); Stephen Alexander George Gustavo Boom, Zeist (NL); Evelyne Leontine Salters, Utrecht (NL); Hendrik Alfred Simeon De Vries, Schoonhoven (NL); Stefan Fritz Brouwer, Schoonhoven (NL)

(73) Assignee: MCi (Mirror Controls International) Netherlands B.V., Woerden (NL)

( * ) Notice: Subject to any disclaimer, the term of this patent is extended or adjusted under 35 U.S.C. 154(b) by 340 days.

(21) Appl. No.: 16/071,226

(22) PCT Filed: Jan. 18, 2017

(86) PCT No.: PCT/NL2017/050026
§ 371 (c)(1),
(2) Date: Jul. 19, 2018

(87) PCT Pub. No.: WO2017/126960
PCT Pub. Date: Jul. 27, 2017

(65) Prior Publication Data
US 2019/0071017 A1    Mar. 7, 2019

(30) Foreign Application Priority Data

Jan. 19, 2016    (NL) ...................................... 2016120

(51) Int. Cl.
    B60R 1/072    (2006.01)
    B60R 1/074    (2006.01)
    B60R 1/12     (2006.01)

(52) U.S. Cl.
    CPC .............. B60R 1/072 (2013.01); B60R 1/074 (2013.01); B60R 2001/1253 (2013.01)

(58) Field of Classification Search
    CPC . B60R 1/072; B60R 1/074; B60R 2001/1253; B60R 2011/0042–0092
    See application file for complete search history.

(56) References Cited

U.S. PATENT DOCUMENTS

| | | | |
|---|---|---|---|
| 6,168,279 B1 * | 1/2001 | Schnell | B60R 1/072 248/481 |
| 2003/0218812 A1 * | 11/2003 | Foote | B60R 1/074 359/874 |

(Continued)

FOREIGN PATENT DOCUMENTS

| | | | | |
|---|---|---|---|---|
| DE | 2907433 B1 | 9/1980 | | |
| DE | 202005018289 U1 * | 1/2006 | ............. | B60R 1/072 |

(Continued)

OTHER PUBLICATIONS

International Search Report, PCT/NL2017/050026, dated Apr. 4, 2017, 5 pgs.

(Continued)

*Primary Examiner* — Kimberly N. Kakalec
(74) *Attorney, Agent, or Firm* — Volpe Koenig

(57) ABSTRACT

Fastening construction for fastening an adjustment instrument to a carrying frame of an exterior vision unit of a motor vehicle, comprising first mounting parts on a fixing part of the adjustment instrument and second mounting parts on the carrying frame, wherein the first and second mounting parts comprise blocking parts on the fixing part and the carrying frame respectively, which in a first position can pass each (Continued)

other upon insertion of the parts into each other in an insert direction, and which by movement in a plane transverse to the insert direction are brought to a second position in which the blocking means cooperate and cannot pass each other upon movement opposite to the insert direction, and wherein furthermore there is provided a spring part which in mounted condition biases the first and second mounting parts against each other.

10 Claims, 7 Drawing Sheets

(56) References Cited

U.S. PATENT DOCUMENTS

| | | | | |
|---|---|---|---|---|
| 2004/0218298 A1* | 11/2004 | Stenzel | ............ | B60R 1/0612 359/879 |
| 2005/0103971 A1* | 5/2005 | Van Stiphout | ............ | B60R 1/076 248/479 |
| 2007/0047116 A1* | 3/2007 | Brouwer | ............ | B60R 1/074 359/877 |
| 2008/0253008 A1* | 10/2008 | Tseng | ............ | B60R 1/0617 359/876 |
| 2010/0224753 A1* | 9/2010 | Brouwer | ............ | B60R 1/072 248/476 |
| 2012/0008223 A1* | 1/2012 | Schadler | ............ | B60R 1/062 359/872 |
| 2013/0328337 A1* | 12/2013 | Melcher | ............ | B60R 1/076 296/1.03 |
| 2015/0129738 A1 | 5/2015 | Bögelein et al. | | |

FOREIGN PATENT DOCUMENTS

| | | |
|---|---|---|
| EP | 0807551 A2 | 11/1997 |
| JP | 08310304 A | 11/1996 |
| JP | 09150671 A | 10/1997 |
| WO | 03/037680 A1 | 5/2003 |
| WO | 2010/028699 A1 | 3/2010 |
| WO | 2012/156044 A1 | 11/2012 |

OTHER PUBLICATIONS

Written Opinion of the International Search Authority, PCT/NL2017/050026, 5pgs.
Office Action (English Translation); Japanese Application No. 2018-556780 dated Nov. 30, 2020.

* cited by examiner

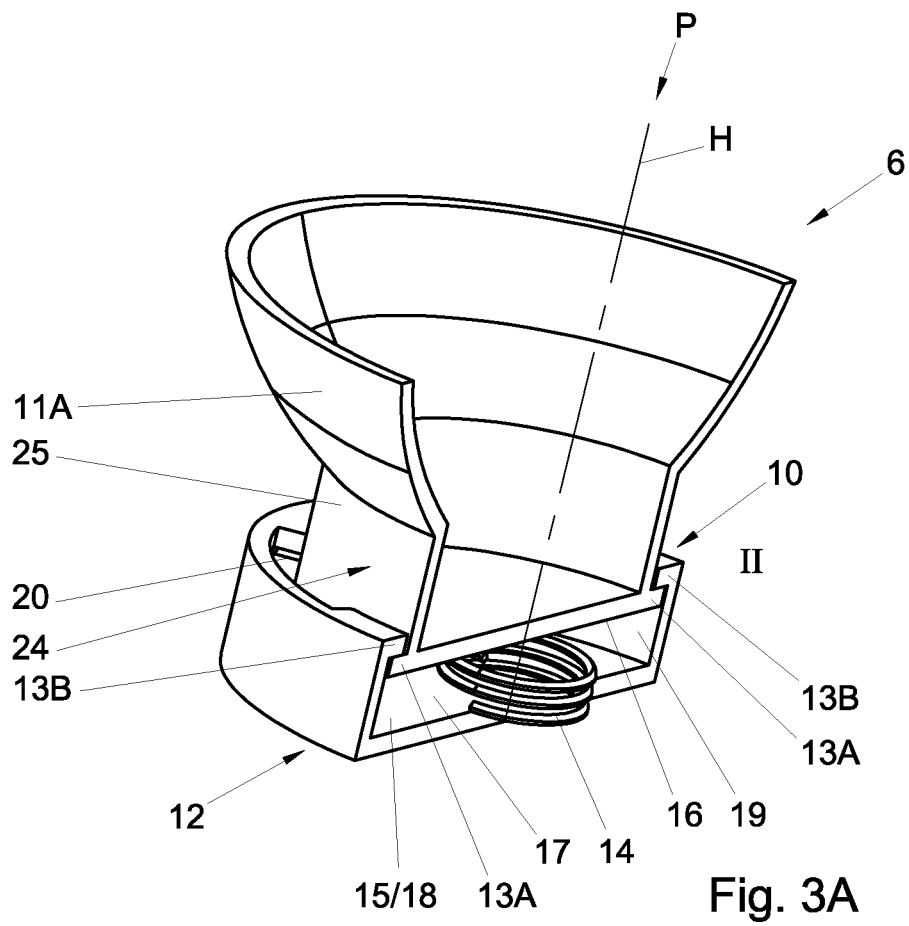
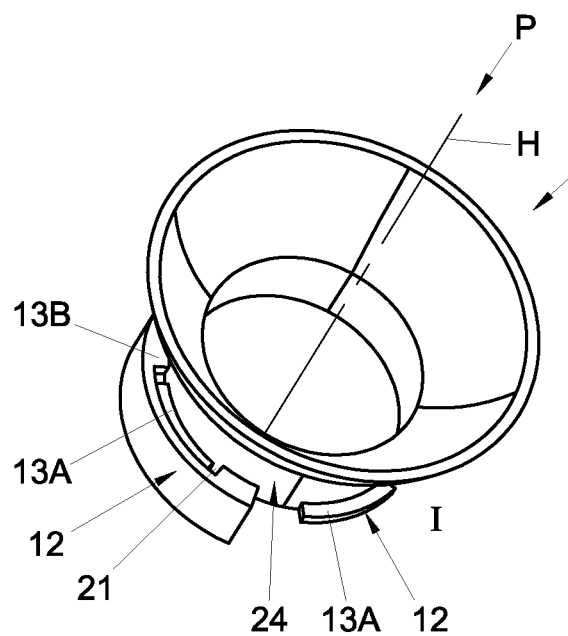 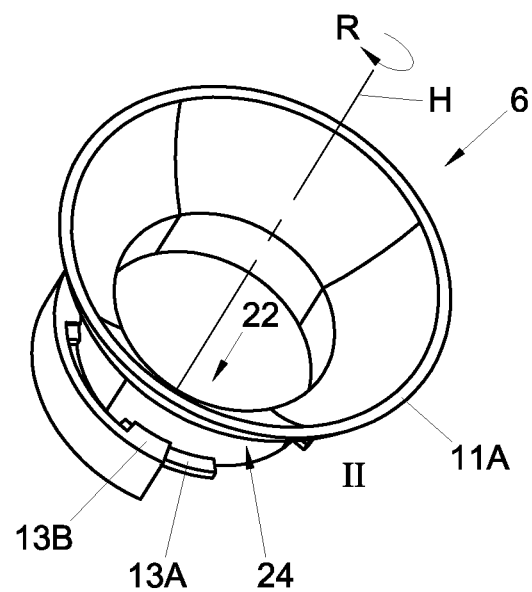
Fig. 3A
Fig. 3B  Fig. 3C

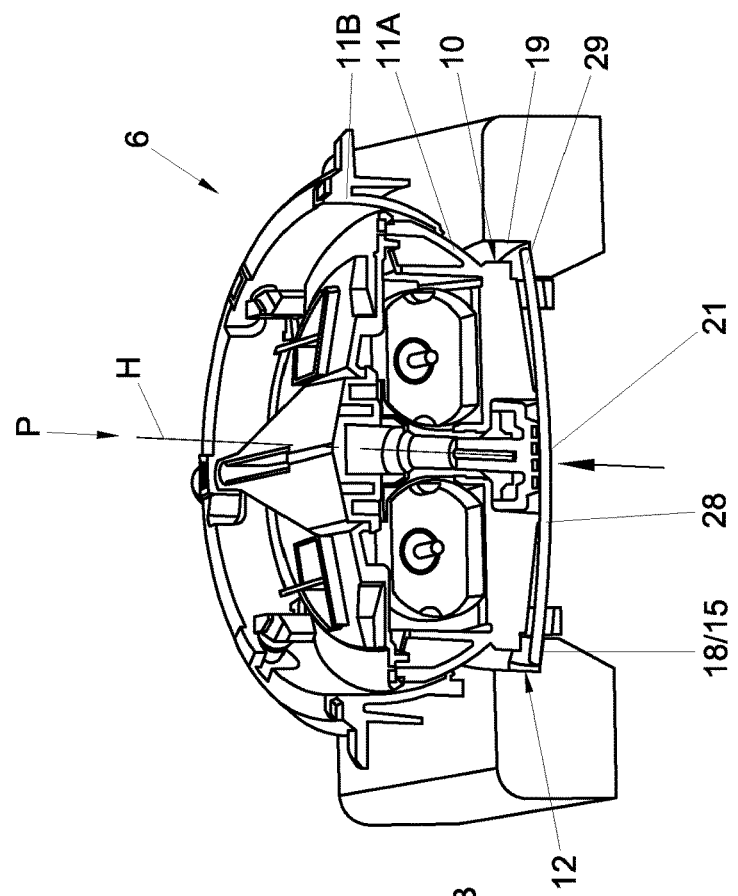
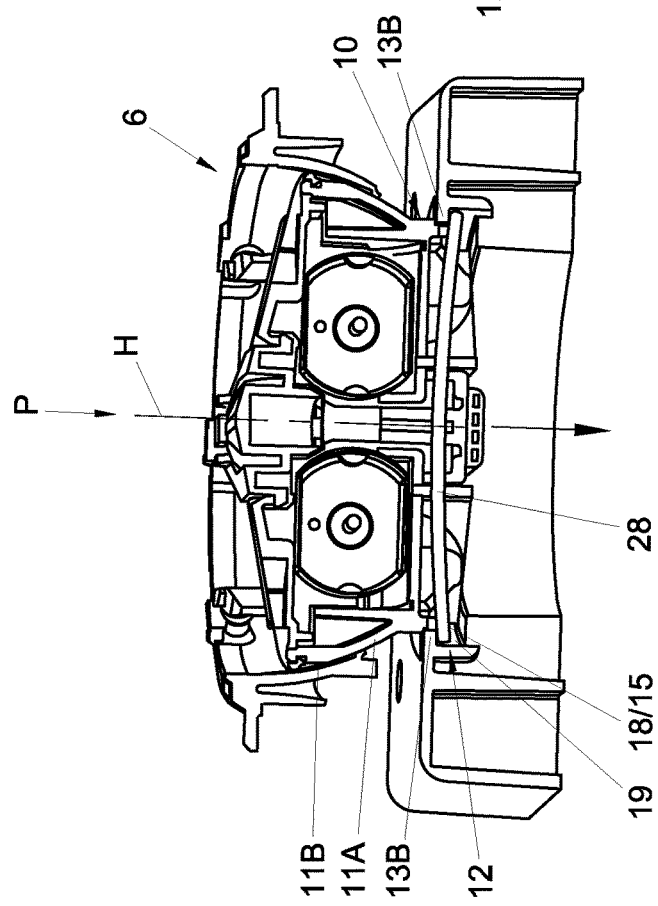

FASTENING CONSTRUCTION FOR FASTENING AN ADJUSTMENT INSTRUMENT FOR AN EXTERIOR VISION ELEMENT, SUCH AS AN EXTERIOR MIRROR, CAMERA AND/OR DISPLAY, TO A CARRYING FRAME OF AN EXTERIOR VISION UNIT OF A MOTOR VEHICLE, AND EXTERIOR VISION UNIT

CROSS REFERENCE TO RELATED APPLICATION

This application is a 35 USC § 371 National Stage application of International Patent Application No. PCT/NL2017/050026, which was filed Jan. 18, 2017, entitled "Fastening Construction for fastening an adjustment instrument for an exterior vision element, such as an exterior mirror, camera and/or display, to a carrying frame of an exterior vision unit of a motor vehicle, and exterior vision unit" and Netherlands Patent Application No. 2016120, which was filed Jan. 19, 2016, and are incorporated herein by reference as if fully set forth.

The invention relates to a fastening construction for fastening an adjustment instrument for an exterior vision element, such as an exterior mirror, camera and/or display, to a carrying frame of an exterior vision unit of a motor vehicle.

An exterior vision unit of a motor vehicle usually comprises a base and a carrying frame. The base comprises a foot for mounting on an outer part of the body of the motor vehicle, and a base shaft extending from the base for receiving the carrying frame pivotably around the base shaft. The carrying frame is usually pivotable around the base shaft between a park position, in which the carrying frame extends substantially along the vehicle, and a folded-out drive position, in which the carrying frame extends substantially transversely to the vehicle. Typically, the carrying frame is connected with the base shaft via an actuator, so that the pivoting movement whereby the carrying frame is folded in and folded out can be performed in a driven manner. Such an actuator is usually referred to with the term power fold actuator. The carrying frame carries an adjustment instrument, which in turn carries an exterior vision element, for example a mirror glass included on a mirror carrying plate. Usually, the carrying frame further carries a cap, which encases the carrying frame and partly surrounds the exterior vision element. The adjustment instrument is often referred to with the term glass adjuster.

The adjustment instrument is intended to adjust the mirror glass relative to the carrying frame, so that when the exterior vision unit is in the drive position, the angle at which a driver can view via the exterior vision element can be set. This often involves adjusting an exterior mirror about an upright and lying axis, so that the field of vision over which the driver can look rearwards can be set. The adjustment instrument usually comprises two plastic housing parts which are pivotably connected with each other, viz., a fixing part for coupling with the carrying frame, and an adjusting part for coupling with the exterior vision element. Typically, the output part is connected with the fixing part via one or more actuators, so that the adjusting movement of the output part which carries the exterior vision element can be performed in a driven manner. In practice, such an actuator is then often referred to as a mirror glass actuator.

The fixing part of the adjustment instrument may be connected to the carrying frame using screws. This screwed connection has as a disadvantage that it costs time to effect it, it requires external parts, is relatively complex to implement faultlessly, and is relatively costly to automate. In connection with the mass fabrication, it has already been proposed in NL1034697 to provide a screwless mounting construction, in particular a bayonet catch.

While that fastening construction offers the advantage of a rapid, simple assembly that can be carried out automatedly in a cost-wise relatively favorable manner, it has turned out in practice that the mounting construction can also entail disadvantages. As a result of tolerances, creep and relaxation of the plastic material, the fixing part in some cases is fixed to the carrying frame insufficiently free from play: in practice, as a consequence, especially in the long term, sometimes unwanted vibrations may develop in the exterior vision element, for example vibrations of a mirror glass during driving.

The invention contemplates a fastening construction for fastening an adjustment instrument to a carrying frame of an exterior vision unit of a motor vehicle, with which, while preserving the advantages mentioned, the disadvantages mentioned can be avoided. In particular, the invention contemplates a screwless fastening construction with which the fixing part of the adjustment instrument can be fixed free from play to the carrying frame of the exterior vision unit. To this end, the invention provides a fastening construction for fastening an adjustment instrument to a carrying frame of an exterior vision unit of a motor vehicle, comprising first mounting parts on a fixing part of the adjustment instrument and second mounting parts on the carrying frame, wherein the first and second mounting parts comprise blocking parts on the fixing part and the carrying frame respectively, which in a first position can pass each other upon insertion of the parts into each other in an insert direction, and which by movement in a plane transverse to the insert direction are brought to a second position in which the blocking means cooperate and cannot pass each other upon movement opposite to the insert direction, and wherein furthermore there is provided a spring part which in mounted condition biases the first and second mounting parts against each other. By the use of the spring part the mounting parts can cooperate under a bias, so that the development of play as a result of tolerances, creep and relaxation of the plastic material can be counteracted, and in practice the development of unwanted vibrations can be avoided. In practice, the fastening construction can comprise multiple spring parts, of one or more springs.

The movement of the blocking parts relative to each other, transverse to the insert direction, can be effected by translation, but is preferably effected by rotation of the blocking parts relative to each other, in particular by rotation of the fixing part around a central axis that coincides with the insert direction. The mounting parts can then cooperate by their blocking parts as a bayonet catch.

When the blocking parts in the second position cooperate under spring action, the development of vibrations can be counteracted very effectively. The spring action may be, for instance, along the insert direction, or opposite thereto, but may alternatively or additionally be transverse to the insert direction.

When the mounting parts comprise a first supporting surface on the carrying frame, and a second supporting surface on the fixing part, which supporting surfaces in mounted position are supported on each other, the stability of the connection can be enhanced, and the development of vibrations can be further counteracted. The spring element may for instance be active between the supporting surfaces, but may also be active between a supporting surface and a blocking part, or—when the spring part is integrated with a blocking part—between the blocking parts mutually.

When the spring part is integrated with a blocking part, a compact, cost effective connection can be realized, because use of an extra component can be avoided. The spring part can comprise, for example, a wire spring, for example, a wire spring which traverses a cylindrical lower side of the fixing part, with outwardly extending ends thereof forming blocking parts. The spring part may also comprise, or constitute, a different kind of spring. Thus, the spring part may comprise a leaf spring. Also, the spring part may comprise multiple spring elements. Elegantly, for instance, there may be provided a leaf spring cross or wire spring cross on the fixing part, with free ends thereof forming blocking parts. The spring part may also, for instance, comprise a spiral spring or helical spring, for example a helical spring which is active between a bottom surface of the carrying frame and a bottom surface of the fixing part. To counteract relaxation, the spring part may be executed in metal, for example, spring steel.

By furthermore providing the mounting parts with a locking which locks the parts in the second position against movement in the plane transverse to the insert direction, unintended dislodgement of the mounting parts from the cooperative position can be prevented. The locking can be implemented, for example, as a locking pin or latch, which prevents translation and/or rotation of the mounting parts relative to each other. The locking may also be configured as a one-way locking, which only prevents a reverse movement in the plane transverse to the insert direction, for example a ratchet stop.

By providing the mounting parts, in particular the blocking parts, with cooperating run-on surfaces, play, if any, can be further counteracted. Thus, for instance, a fixation along the insert direction and opposite thereto can be ensured. Elegantly, the cooperating run-on surfaces may be spring-energized to counteract unintended detachment, for instance using spring elements acting transversely to the insert direction.

The invention also relates to an exterior vision unit for a motor vehicle, comprising a fastening construction for fastening an adjustment instrument for an exterior vision element, such as an exterior mirror, camera and/or display, to a carrying frame of the exterior vision unit.

Regarding the disclosure in this application, it is noted that the technical features of the fastening construction described in the independent claim can also be regarded as an invention independently or in combination with only one or several technical features from the main claim, the subclaims or the description.

The invention will be further explained on the basis of an exemplary embodiment of a fastening construction, that is shown in drawings. In the drawings:

FIG. 3A shows a sectional schematic perspective view of a first embodiment of a fastening construction according to the invention;

FIG. 3B shows a schematic perspective view of the fastening construction of FIG. 3A during insertion;

FIG. 3C shows a schematic perspective view of the fastening construction of FIG. 3A in mounted condition, second position;

Figure 5A:
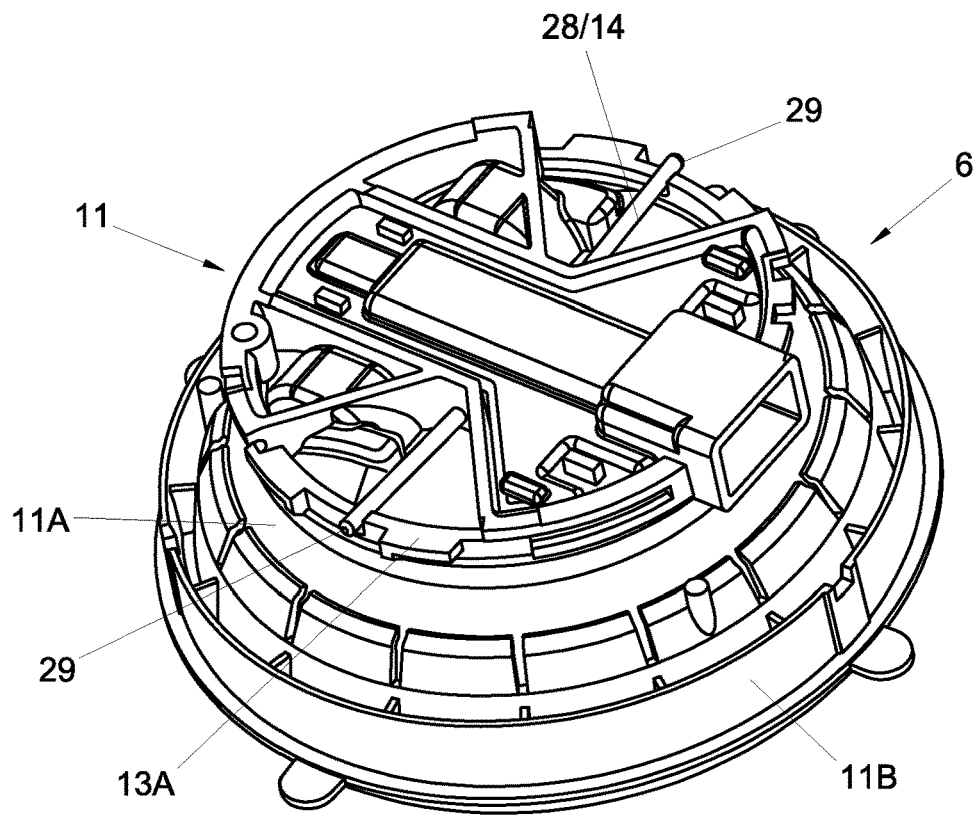
FIG. 5A shows a schematic perspective view of a third embodiment of a fastening construction according to the invention.
Figure 6A:
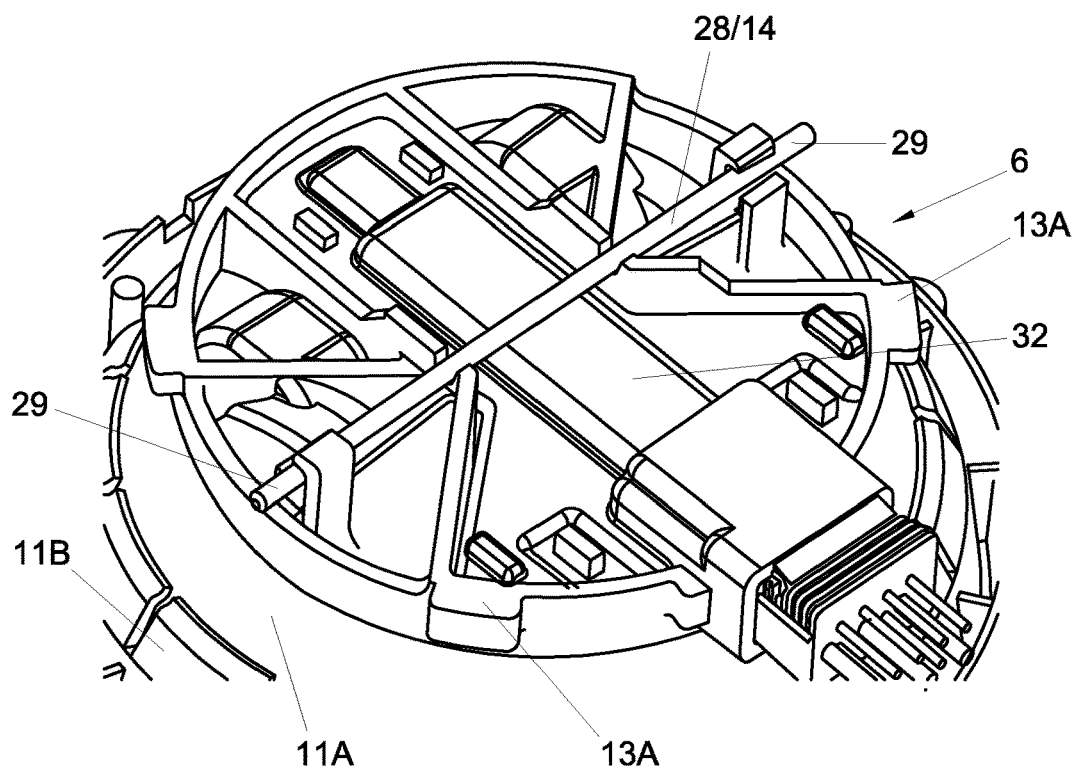
Figure 5C:
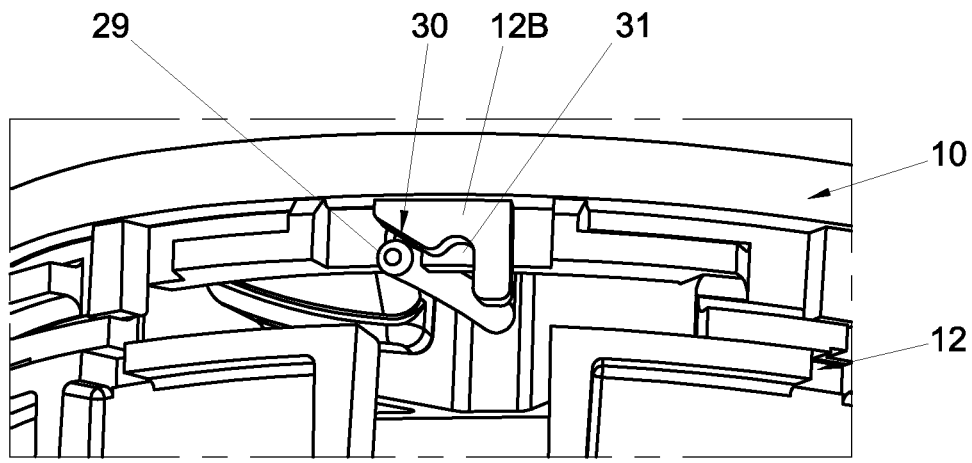
FIG. 5B shows a schematic longitudinal section of the fastening construction of FIG. 5A.
Figure 7A:
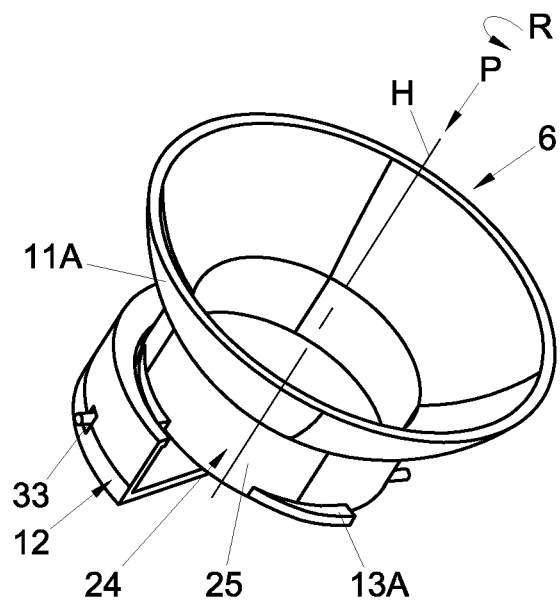
Figure 7C:
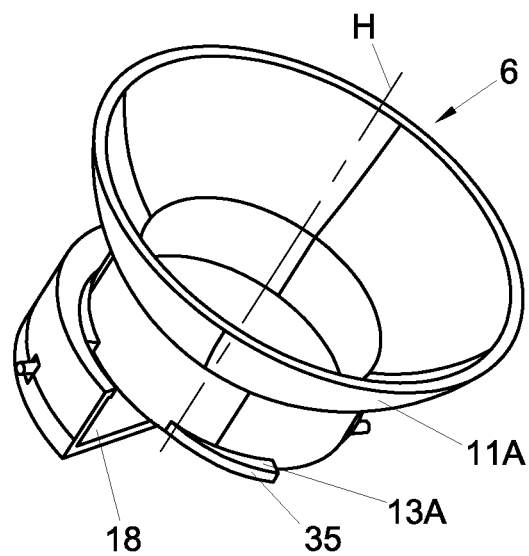
Figure 7B:
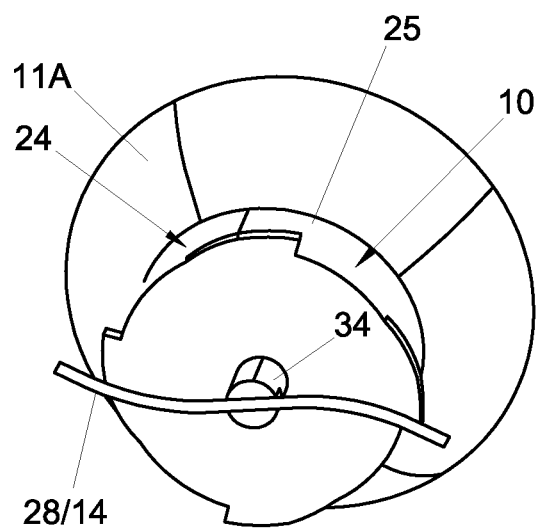
Figure 7D:
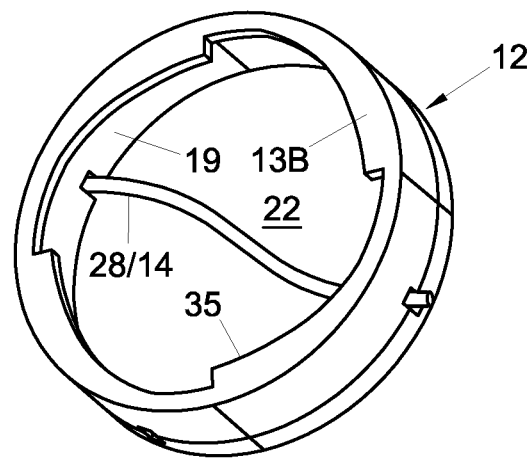

FIGS. 5C and D show schematic detailed views of the locking of the fastening construction of FIG. 5A;

FIG. 6A shows a schematic perspective view of a fourth embodiment of a fastening construction according to the invention;

FIG. 6B shows a schematic longitudinal section of the fastening construction of FIG. 6A;

FIG. 7A shows a sectional schematic perspective view of a fifth embodiment of a fastening construction according to the invention during insertion;

FIG. 7B shows a schematic perspective view of the fixing part of the fastening construction of FIG. 7A engaging a wire spring;

FIG. 7C shows a sectional schematic perspective view of the fastening construction of FIG. 7A in mounted condition;

FIG. 7D shows a schematic perspective view of the second mounting parts of the fastening construction of FIG. 7A including the wire spring such as it is deformed in the mounted condition.

In the figures, like or corresponding parts are designated by the same reference numerals. It is noted that the figures are merely shown by way of exemplary embodiment and should not be regarded as limiting in any way.

Figure 1:
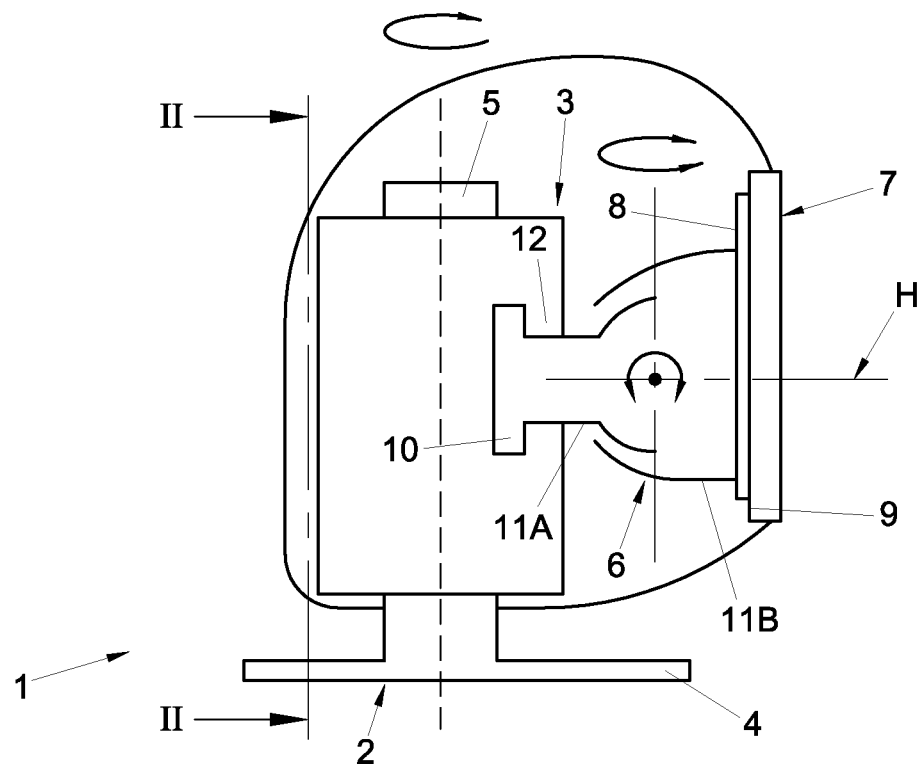
FIG. 1 shows a schematic cross section of an exterior vision unit for a motor vehicle provided with a fastening construction for fastening an adjustment instrument to a carrying frame of the exterior vision unit.
Figure 2:
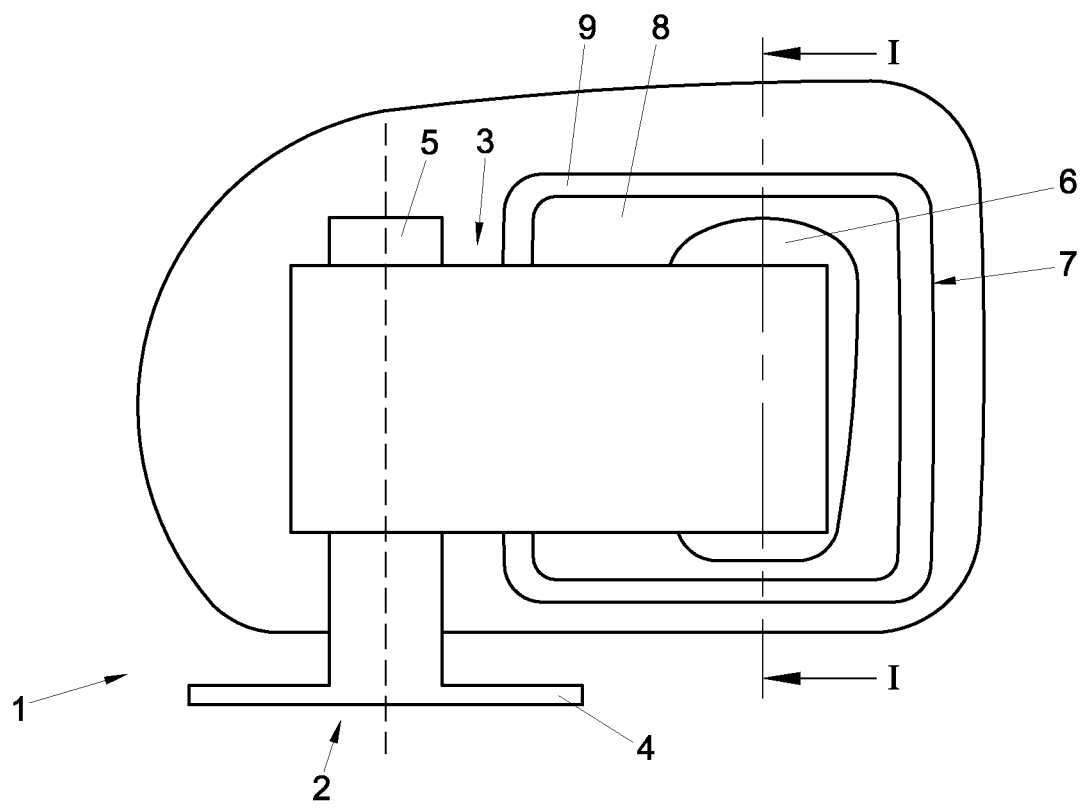
FIG. 2 shows a schematic longitudinal section of the exterior vision unit of FIG. 1.

FIGS. 1 and 2 show schematic sectional views of an exterior vision unit 1 for a motor vehicle. The exterior vision unit 1 comprises a base 2 and a carrying frame 3. The base 2 comprises a foot 4 for mounting on an outer part of the body of the motor vehicle, and a base shaft 5 extending from the base 2 for receiving the carrying frame 3 pivotably around the base shaft 5. The carrying frame 3 is pivotable around the base shaft 5 between a park position, not shown in the figure, in which the carrying frame 3 extends substantially along the vehicle, and a folded-drive position, shown in the figure, in which the carrying frame 3 extends substantially transversely to the vehicle. The carrying frame 3 carries an adjustment instrument. The adjustment instrument in turn carries an exterior vision element, in this example formed by a mirror glass 9 mounted on a mirror carrying plate. The adjustment instrument comprises two plastic housing parts which are pivotably connected with each other, viz., a fixing part 11A, for coupling with the carrying frame 3, and an adjusting part 11B for coupling with the exterior vision element 7.

FIG. 3A shows a first embodiment of the fastening construction for fastening the adjustment instrument to the carrying frame 3 of the exterior vision unit 1 of FIGS. 1 and 2. The adjusting part 11B is not represented, and of the carrying frame 3 only the portion that forms a mounting part is represented. The fastening construction comprises first mounting parts 10 on a fixing part 11A of the adjustment instrument and second mounting parts 12 on the carrying frame 3. The first and second mounting parts 10, 12 comprise blocking parts 13A, 13B on the fixing part 11A and the carrying frame 3, respectively. The blocking parts 13A, 13B, in a first position I shown in FIG. 3B, can pass each other when the parts are being inserted into each other in an insert direction P extending along a main axis H. The blocking parts as shown in FIG. 3B can, by movement in a plane transverse to the insert direction P, be brought to a second position II. In the second position II, the blocking means cooperate and cannot pass each other upon movement opposite to the insert direction P.

In accordance with the invention, furthermore, there is provided a spring part 14 which in mounted condition biases the first and second mounting parts 10, 12 against each other. By use of the spring part 14, the mounting parts 10, 12 can cooperate under a bias, so that development of play as a result of tolerances, creep and relaxation of the plastic material can be counteracted, and in practice development of unwanted vibrations can be avoided.

The movement of the blocking parts 13A in the plane transverse to the insert direction P is effected in this example by rotation of the blocking parts 13A relative to the blocking parts 13B, in particular by rotation of the fixing part 11A around a central axis which coincides with the insert direction P. The mounting parts 10, 12, through their blocking parts 13A, 13B, work together as a bayonet catch. In this exemplary embodiment, the blocking parts 13A, 13B in the second position II cooperate under spring action, and the spring action is opposite to the insert direction P.

The mounting parts 10, 12 comprise a first supporting surface 15 on the carrying frame 3, and a second supporting surface 16 on fixing part 11A, 11B. The supporting surfaces 15, 16 in mounted position may be supported on each other directly or indirectly. The spring part 14 is here implemented as a spring steel helical spring. The mounting parts 12 of the carrying frame 3 comprise in this exemplary embodiment a substantially cylindrical chamber 17 in the carrying frame 3, with a bottom surface 18 which forms the first supporting surface 15, a circumferential wall 19 which forms an auxiliary supporting surface, and bayonet lips 21B, spaced apart along the circumferential wall 19 with mutual interspaces 20 and which at the access opening 22 extend into the chamber 17. The fixing part 11A comprises a substantially cylindrical foot part 24 for reception in the chamber 17 in the carrying frame 3. A bottom surface 23 of the foot part 24 forms a second supporting surface 16, and the cylinder shell 25 of the foot part 24 forms an auxiliary supporting surface. The foot part 24 is complementary to the circumferential wall 19 of the chamber 17 provided with outwardly extending bayonet lips 21A spaced apart along the circumferential wall 19 with mutual interspaces 20. In the first position I the adjustment instrument can be inserted by its foot part 24 into the chamber 17, thereby compressing the helical spring. Then, by rotation of the foot part 24, the bayonet lips 21A, 21B can be aligned so as to block each other. The helical spring 14 is active between the bottom surface 18 of the carrying frame 3 and a bottom surface 23 of the fixing part 11A, against the insert direction P. Upon release after insertion and rotation, the bayonet lips 21A, 21B are thereby supported on each other under spring action, so that the adjustment instrument 6 is received in the carrying frame 3 so as to be axially free from play. The auxiliary supporting surfaces here provide for radial retention.

Figure 4A:
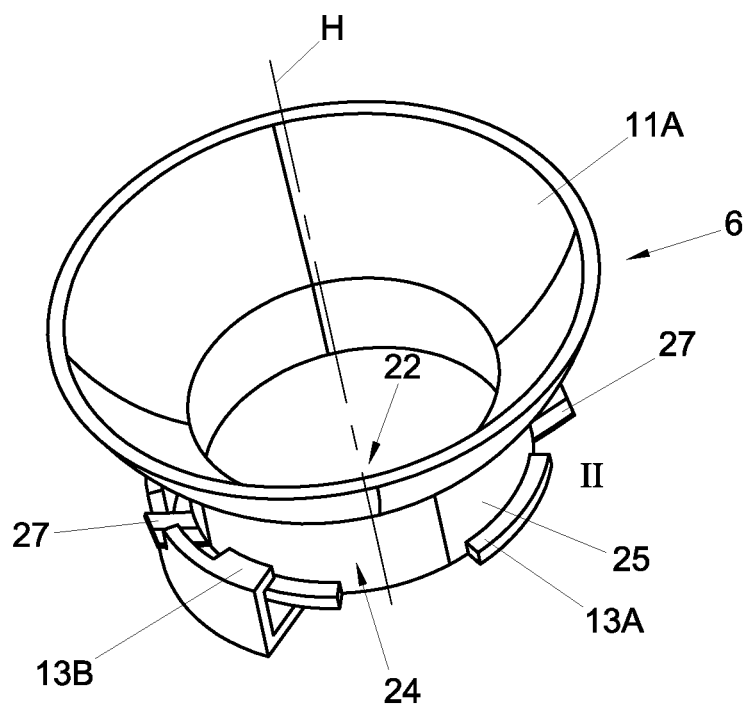
FIG. 4A and FIG. 4B show sectional schematic perspective views of a second embodiment of a fastening construction according to the invention.
Figure 4B:
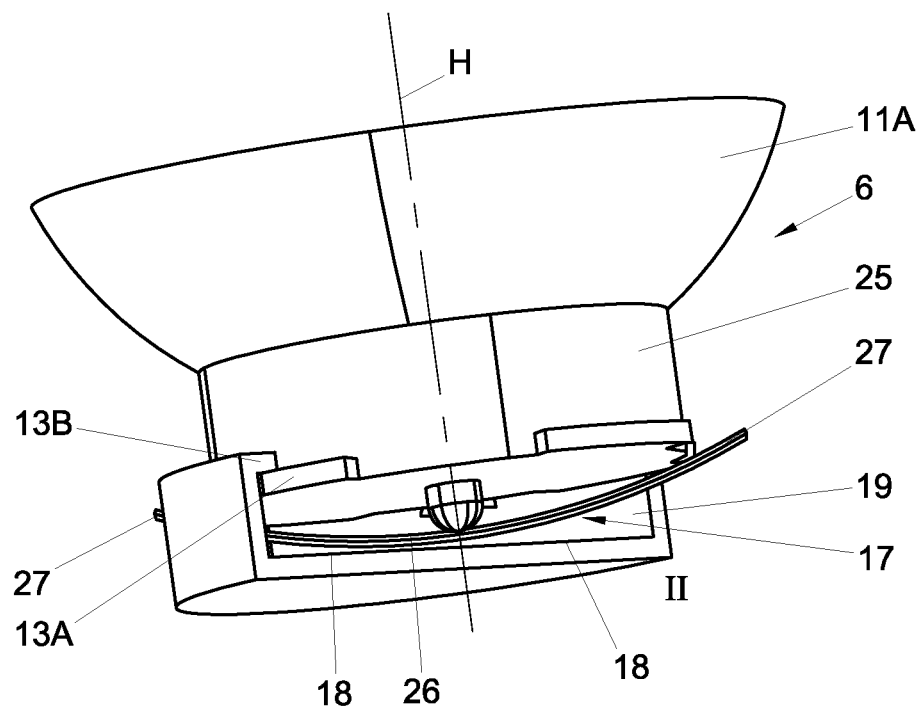

FIGS. 4A and 4B show a second embodiment, in which the spring part 14 is implemented as a leaf spring 26. The free ends 27 of the leaf spring 26 are here supported on first supporting surfaces 15 which are formed by retaining chambers in the circumferential wall 19 of the chamber 17. It is noted that the spring part 14 can comprise multiple spring elements. Elegantly, for instance, a cross of leaf springs may be provided.

Figure 5D:
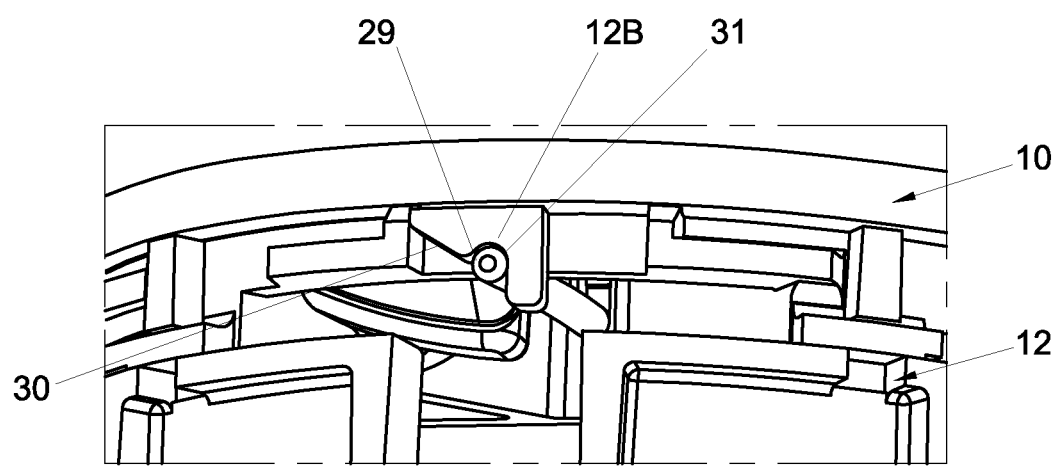

FIGS. 5A-5D show a third embodiment, in which the spring part 14 is integrated with a blocking part 13A. The spring part 14 is implemented as a wire spring 28 which traverses the foot part 24 of the fixing part, and with outwardly extending free edges 29 thereof forming blocking parts. The wire spring 28 is held in the middle of the foot part 24, and the free ends 29 bend in that during assembly they are hooked behind the blocking parts on the circumferential wall 19 of the chamber 17. The blocking parts 13A of the adjustment instrument in this embodiment are formed by the spring part 14. In this embodiment the spring element acts in insert direction P. In FIGS. 5C and 5D it is shown that a rotational locking is provided. The locking is implemented as a one-way locking, which only counteracts a reverse rotation from the second position II to the first position I. The blocking parts on the circumferential wall 19 of the access opening 22 are implemented with oblique run-on sides 30, and locking recesses 31 for the free ends 29 of the wire spring 28, and form a ratchet stop.

FIGS. 6A and 6B show a fourth embodiment, also with a wire spring 28. Here, the locking is implemented as a latch 32 which, in the second position II of the mounting parts, is inserted through the circumferential wall 19 of the chamber 17 and the foot part 24, and thereby counteracts rotation of the mounting parts relative to each other. The wire spring 28 is bent as a result of the insertion of the latch, so that the free ends 29 push off against the bottom surface 18 of the chamber 17, and energize the bayonet lips 21A, 21B—not visible in the cross section of FIG. 6B—against each other in opposite direction to the insert direction P.

FIGS. 7A and 7B show a fifth embodiment, in which is provided a wire spring 28 which traverses the chamber 17, and which by its ends is received in openings 32 in the circumferential wall 19. During assembly, the wire spring 28 upon insertion is pressed downwards by a gripper 33 on the bottom surface 23, and during rotation is twisted into the S shape shown in the figures. During rotation, the blocking parts 13A on the foot part 24 are passed under the blocking parts 13B on the circumference of the chamber 17, and after release come to lie in each other's plane. The blocking parts are provided with cooperating run-on surfaces 34, which under the action of the spring element are biased against each other in circumferential direction. Thus, radial play can be eliminated, and at the same time an axial clamping can be accomplished. The cooperating run-on surfaces 34 are spring-energized in circumferential direction, tangentially, that is, in the plane transverse to the insert direction.

The invention is not limited to the exemplary embodiments represented here. Many variations will be clear to those skilled in the art and are understood to be within the scope of the invention as represented in the following claims.

LIST OF REFERENCE SIGNS 1. exterior vision unit
2. base
3. carrying frame
4. foot
5. base shaft
6. adjustment instrument
7. exterior vision element
8. mirror carrying plate
9. mirror glass
10. first mounting parts
11A. fixing part
11B. adjusting part
12. second mounting parts
13A. blocking part
13B. blocking part
14. spring part 15. first supporting surface
16. second supporting surface
17. chamber
18. bottom surface
19. circumferential wall
20. interspace
21A. bayonet lip
21B. bayonet lip
22. access opening
23. bottom surface
24. foot part
25. cylinder shell
26. leaf spring
27. free end
28. wire spring
29. free end
30. oblique run-on side
31. locking recess
32. opening
33. gripper
34. run-on surface
P insert direction
H main axis
R direction of rotation
I first position
II second position

The invention claimed is:

1. A fastening construction for fastening an adjustment instrument to a carrying frame of an exterior vision unit of a motor vehicle, comprising:
   first mounting parts on a fixing part of the adjustment instrument;
   second mounting parts on the carrying frame; and
   a spring part,
   wherein the first and second mounting parts comprise blocking parts on the fixing part and the carrying frame respectively, which pass each other upon insertion of the parts into each other in an insert direction to arrive at a first position, and which by movement in a plane transverse to the insert direction are brought to a second position in which the blocking means cooperate and cannot pass each other upon movement opposite to the insert direction,
   wherein the spring part biases the first and second mounting parts against each other in the second position, and wherein the spring part comprises a wire spring which traverses the fixing part, and with outwardly extending free ends thereof forms at least part of the blocking parts of the fixing part.

2. The fastening construction according to claim 1, wherein the blocking parts in the second position cooperate under spring action.

3. The fastening construction according to claim 1, wherein the first and second mounting parts comprise a first supporting surface on the carrying frame, and a second supporting surface on the fixing part, respectively, and wherein the first and second supporting surfaces in the mounted condition are supported on each other.

4. The fastening construction according to claim 1, wherein the spring part is integrated with a blocking part.

5. The fastening construction according to claim 1, wherein the spring part is implemented in metal.

6. The fastening construction according to claim 5, wherein the spring part is spring steel.

7. The fastening construction according to claim 1, wherein the fixing part is made from plastic material.

8. The fastening construction according to claim 1, wherein a locking is further provided which locks the first and second mounting parts in the second position against movement in the plane transverse to the insert direction.

9. The fastening construction according to claim 1, wherein the first and second mounting parts further comprise cooperating run-on surfaces.

10. An exterior vision unit for a motor vehicle, comprising a base and a carrying frame, wherein the base comprises a foot for mounting on an outer part of the body of the motor vehicle, and a base shaft extending from the base for receiving the carrying frame pivotably around the base shaft, and wherein the carrying frame is pivotable around the base shaft between a park position, in which the carrying frame extends substantially along the vehicle, and a folded-out drive position, in which the carrying frame extends substantially transversely to the vehicle, and wherein the carrying frame carries an adjustment instrument which in turn carries an exterior vision element, further comprising the fastening construction according to claim 1 which fastens the adjustment instrument for the exterior vision element to the carrying frame of the exterior vision unit.

* * * * *